US012584602B2

(12) United States Patent
Knobloch et al.

(10) Patent No.: US 12,584,602 B2
(45) Date of Patent: Mar. 24, 2026

(54) ILLUMINATION DEVICE FOR MOTOR VEHICLE HEADLIGHT AND MOTOR VEHICLE HEADLIGHT

(71) Applicant: ZKW Group GmbH, Wieselburg (AT)

(72) Inventors: Christian Knobloch, Persenbeug-Gottsdorf (AT); Patrick Schmidt, Wieselburg (AT); Daniel Seitl, Gföhl (AT)

(73) Assignee: ZKW Group GmbH, Wieselburg (AT)

( * ) Notice: Subject to any disclaimer, the term of this patent is extended or adjusted under 35 U.S.C. 154(b) by 9 days.

(21) Appl. No.: 18/655,622

(22) Filed: May 6, 2024

(65) Prior Publication Data

US 2024/0377043 A1 Nov. 14, 2024

(30) Foreign Application Priority Data

May 12, 2023 (EP) .................................... 23173075

(51) Int. Cl.

| | |
|---|---|
| ***F21S 41/27*** | (2018.01) |
| ***F21S 41/143*** | (2018.01) |
| ***F21S 41/40*** | (2018.01) |
| *F21W 102/135* | (2018.01) |
| *F21W 102/18* | (2018.01) |

(52) U.S. Cl.

CPC ............ *F21S 41/27* (2018.01); *F21S 41/143* (2018.01); *F21S 41/40* (2018.01); *F21W 2102/135* (2018.01); *F21W 2102/18* (2018.01)

(58) Field of Classification Search

CPC .......... F21S 41/27; F21S 41/143; F21S 41/40; F21S 41/255; F21S 41/285; F21S 41/18; F21S 41/25; F21S 41/32; F21W 2102/135; F21W 2102/18; F21W 2102/145

See application file for complete search history.

(56) References Cited

U.S. PATENT DOCUMENTS

| | | | |
|---|---|---|---|
| 2015/0062950 | A1 | 3/2015 | Fedosik et al. |
| 2022/0034470 | A1 | 2/2022 | Chen et al. |

FOREIGN PATENT DOCUMENTS

| | | | |
|---|---|---|---|
| EP | 4137744 | A1 | 2/2023 |
| WO | 2021246065 | A1 | 12/2021 |
| WO | 2022100057 | A1 | 5/2022 |

OTHER PUBLICATIONS

Extended European Search Report for European Patent Application No. 23173075.5 dated Oct. 20, 2023 (45 Pages).

*Primary Examiner* — Elmito Breval

(74) *Attorney, Agent, or Firm* — Eversheds Sutherland (US) LLP

(57) ABSTRACT

Illumination device for a motor vehicle headlight. The device has a light source, a light-permeable body (LPB), a light injection element for injecting light from the light source into the LPB, and a projection device. Light from the light source forms a light distribution with a cut-off line formed by a screen edge of a screen device, which is formed by a boundary surface of the LPB. A sign light light source (SLLS) and a further sign light light injection element (SLLIE) associated with the SLLS are provided. The SLLIE forms the light emitted by the SLLS into a third light beam and directs the third light beam onto the boundary surface, which re-enter the LPB and are projected by the projection optics device as a sign light light beam into a region of the light distribution lying above the cut-off line and are displayed as sign light light distribution.

22 Claims, 4 Drawing Sheets

ILLUMINATION DEVICE FOR MOTOR VEHICLE HEADLIGHT AND MOTOR VEHICLE HEADLIGHT

CROSS-REFERENCE TO RELATED APPLICATIONS

This application claims priority to European Patent Application No. 23173075.5, filed May 12, 2023, which is incorporated herein by reference.

FIELD OF THE INVENTION AND DESCRIPTION OF PRIOR ART

The invention relates to an illumination device for a motor vehicle headlight for producing a light distribution, wherein the illumination device comprises (i) at least one light source, (ii) a light-permeable body, (iii) at least one light injection element for injecting light emitted by the at least one light source into the light-permeable body, and (iv) a projection device, wherein the light-permeable body has a screen device with a screen edge region and the screen device is arranged between the light injection element and the projection device in a light propagation direction, wherein light from the at least one light source enters the light-permeable body via the light injection element, which light propagates in the light-permeable body as a first light beam, and wherein the screen device modifies the first light beam into a modified second light beam, which is displayed by the projection device as the light distribution to be produced, the light distribution has a cut-off line, wherein the cut-off line, in particular the shape and position of the cut-off line, is determined by a screen edge region or a screen edge of the screen device and wherein the screen device is formed by at least one boundary surface of the light-permeable body. Furthermore, the invention relates to a motor vehicle headlight having at least one such illumination device.

Illumination devices described above are known from the prior art, in which sign light light distribution can also be produced by modifying the light-permeable body, the light injection element or the projection device in addition to front area light or dipped beam distribution with the at least one light source.

SUMMARY OF THE INVENTION

It is an object of the invention to provide an illumination device with which sign light light distribution can be produced in addition to near-field or dipped beam distribution.

This object is achieved with an illumination device described in the introduction by virtue of the fact that according to the invention the illumination device has at least one further light source, the so-called sign light light source, as well as a further sign light light injection element associated with the sign light light source, wherein the sign light light injection element forms the light emitted by the sign light light source into a third light beam and directs the third light beam onto the boundary surface such that light rays, in particular substantially all light rays of the third light beam enter the light-permeable body, and wherein at least some, preferably all, of the light rays which have re-entered the light-permeable body are projected by the projection optics device as a sign light light beam into a region of the light distribution lying above the cut-off line and are displayed, for example as sign light light distribution.

Thanks to the design according to the invention, the sign light light source can be switched off (or dimmed) in partial full beam mode such that the sign light cannot emit any unwanted scattered light in this operating state.

Partial full beam mode is understood as an operating state in which one or more regions, so-called segments, of full beam distribution are hidden in order, for example, to avoid dazzling oncoming traffic or traffic in front.

In an operating state in which the light distribution, in particular front area light distribution or dipped beam distribution, is produced with the at least one light source, the sign light light source can be switched on such that a sign light light distribution is produced in addition to the light distribution, independently thereof. However, in the prior art, the sign light light distribution is produced together with the front area light or dipped beam (i.e. the at least one light source responsible for producing the front area light or dipped beam distribution is also responsible for producing the sign light light distribution) and cannot be switched off independently thereof.

The invention accordingly has advantages in terms of the glare value, in particular when the illumination device is operated in ADB (Advanced Driving Beam) mode, in which individual regions or segments of (partial) full beam distribution can be switched off. The fact that the sign light is switched off in this operating state, in contrast to the prior art, means that it cannot cause glare in the hidden region or in the hidden/switched off segments. Safety can be enhanced for all road users thanks to the reduction of undesired "residual light", in particular in hidden regions, made possible by the invention. In dipped beam mode, the sign light can be activated to enable the driver, for example, to read overhead signs more easily.

In contrast, in "normal" full beam mode, the sign light light source can be switched on.

It is preferably provided that the sign light light injection element comes into contact with the light injection element in a common contact region or in a common contact area. This has the advantage in particular when the two elements are made of the same material that the incident light rays are not deflected in their direction of propagation and can therefore be better controlled in terms of design.

The contact region or contact area is advantageously positioned in such a way, for example in relation to or at a distance from the at least one light source that at least some of the light rays coming from the light source which enter the sign light light injection element via the contact region or contact area are totally reflected at a light exit surface of the sign light light injection element.

This light accordingly does not contribute to the light distribution and is deflected into a region where it remains unused and is, for example absorbed.

It can further be provided that the contact region or contact area is positioned in such a way, for example in relation to or at a distance from the at least one light source that at least some of the light rays coming from the light source which strike a light injection element boundary surface of the light injection element upstream of the contact region or contact area are totally reflected at the light injection element boundary surface into the light injection element in the direction of the light-permeable body.

This light can thus contribute to the light distribution, for example to the front area light or dipped beam distribution.

The sign light light source is preferably positioned as close as possible to a light entry surface of the sign light light injection element in order to be able to capture as much light as possible and in order to minimize rays emitted by the sign light light source that could enter the light injection element as stray light.

It can further be provided that a light entry surface of the sign light light injection element is concave, and/or a light exit surface of the sign light light injection element is convex.

In particular, it can be provided that the sign light light injection element has a focal point, and the sign light light source is arranged substantially in the focal point.

The light entry surface is preferably as concave as possible in order to increase the injection efficiency, by the light source being arranged in the concave cavity resulting from this design, preferably as deep as possible, and thus being enclosed by the light entry surface at least in the angular range in which the light source emits light.

Due to the preferably convex light exit surface, the scattered light is largely totally reflected and deflected away backwards.

The in particular highly curved design of the light entry surface makes it possible to achieve the most highly curved light exit surface possible such that light rays coming from the light injection element that enter the sign light light injection element are deflected by total reflection at the light exit surface such that they cannot emerge from the sign light light injection element in the direction of light propagation. This scattered light is preferably deflected backwards, against the actual direction of light propagation.

It is advantageous when the sign light light injection element and the light injection element are integrally formed, in particular from the same material, for example by the sign light light injection element and the light injection element being injection moulded together in an injection moulding process.

The at least one light source and the sign light light source are preferably arranged in such a way that the main light beam directions of the at least one light source and the sign light light source run parallel to one another.

It can be provided that the at least one light source and the sign light light source are arranged in a common plane and/or the at least one light source and the sign light light source are arranged on a common printed circuit board.

It can also be provided that the at least one light source is mounted directly on a heat sink and is connected to a printed circuit board, for example, by means of wire bonding, on which the sign light light source is arranged.

It is preferably provided that the light emitted by the sign light light source is emitted by the sign light light injection element directly onto the boundary surface.

In this context, "directly" should be understood to mean that the light is not influenced further on its way to the surface 106 and in particular does not undergo any deflection either, i.e. propagates in a straight line to the boundary surface.

It can be provided that the at least one light injection element and the sign light light injection element form a single-piece transparent, light-permeable body. Furthermore, it can also be provided that the light-permeable body and the projection device are integrally connected to this light-permeable body.

Furthermore, it can preferably be provided that the light injection element is designed in such a way that it focuses the light, which is emitted by the light source and enters the light injection element, to form the first light beam, wherein the light beam is preferably directed into the screen edge region or into a region of the screen edge of the screen device.

It can be provided that the sign light light injection element illuminates the boundary surface, which forms the screen device or is at least part of the screen device, with the third light beam in such a way that a maximum of the illuminance of the light pattern formed on the boundary surface is at a distance greater than zero from the screen edge and/or the light pattern is at a distance greater than zero from the screen edge.

This allows a gap to be created in the overall light distribution in the traffic area or on a vertical aiming screen in front of the illumination device between the dipped beam distribution and the sign light light distribution.

It is further advantageous when the sign light light injection element is designed in such a way that the light beam emerging from the sign light light injection element is widened in the horizontal direction.

For example, the sign light light injection element is anamorphic or astigmatic or the light entry surface and/or the light exit surface are designed in such a way that the light pattern formed on the boundary surface is widened/distorted in the horizontal direction and can thus produce wide illumination. Such a design can be achieved by virtue of the fact that there is less curvature of the sign light light injection element in the horizontal direction compared to the vertical direction.

Furthermore, the sign light light injection element can be designed in such a way that the light rays of the light beam emerging from the sign light light injection element converge in the vertical direction.

This can be achieved, for example, by the light exit surface being convex in the vertical direction (i.e. in vertical sections parallel to the main light beam direction).

It can further be provided that the boundary surface is convex in the vertical direction.

In general, the boundary surface preferably lies substantially within a focal surface or Petzval surface of the projection device such that the illuminated region on the boundary surface is displayed by the projection device as sign light light distribution.

To achieve light uniformity, it can be provided that the boundary surface of the light-permeable body has a light diffusing structure, e.g. a grain.

This results in a uniformly illuminated area on the boundary surface, which is displayed by the projection device as described above and leads to a uniform sign light light distribution.

By way of example, it is provided that the at least one light source and/or the sign light light source respectively comprise(s) one or more light-emitting elements, for example one or more LEDs.

In general, regardless of the specific design of the respective light source/sign light light source, it should be noted at this point that the phrasing "at least one light source (for producing the light distribution)" means that exactly one such light source, but of course also two or more such light sources can be provided in order to produce the light distribution. The phrasing "has a sign light light source" does not exclude the possibility that two or more such sign light light sources can be provided for producing sign light.

It can be provided that the illumination device further comprises an additional light module, which is designed to produce additional full beam distribution, wherein the additional light module is designed to produce segmented additional light distribution, which comprises two or more light segments, and wherein the additional light distribution and the light distribution together form full beam distribution if all light segments of the additional light distribution are illuminated, and wherein in dipped beam mode the at least one light source for producing the light distribution and the sign light light source for producing the sign light light distribution are activated and the additional light module is deactivated, and wherein in partial full beam mode at least one light source for producing the light distribution and the additional light module are activated, wherein the additional light module is operated in such a way that one or more light segments are not illuminated and the sign light light source for producing the sign light light distribution is dimmed or deactivated.

BRIEF DESCRIPTION OF THE DRAWINGS

The invention is explained in more detail below based on the drawing. In this

DETAILED DESCRIPTION OF EMBODIMENTS OF THE INVENTION

Figure 1:
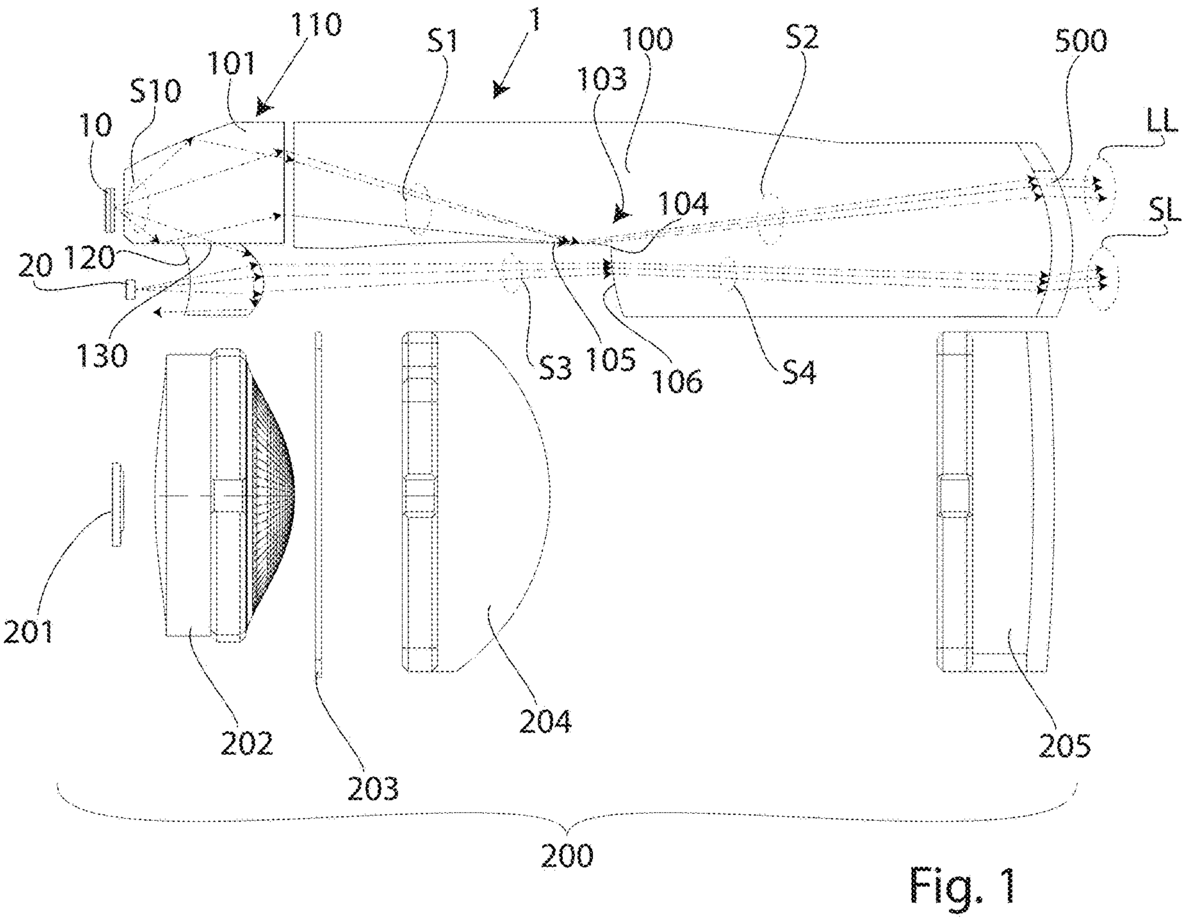
FIG. 1 shows the essential components of an embodiment according to the invention of an illumination device for a motor vehicle headlight in a vertical section along the plane E shown in FIG. 3.

FIG. 1 shows an illumination device 1 for a motor vehicle headlight for producing light distribution LV, wherein the illumination device has at least one light source 10, a light-permeable body 100, at least one light injection element 101 for injecting light emitted by the at least one light source 10 into the light-permeable body 100 and a projection device 500.

Figure 3:
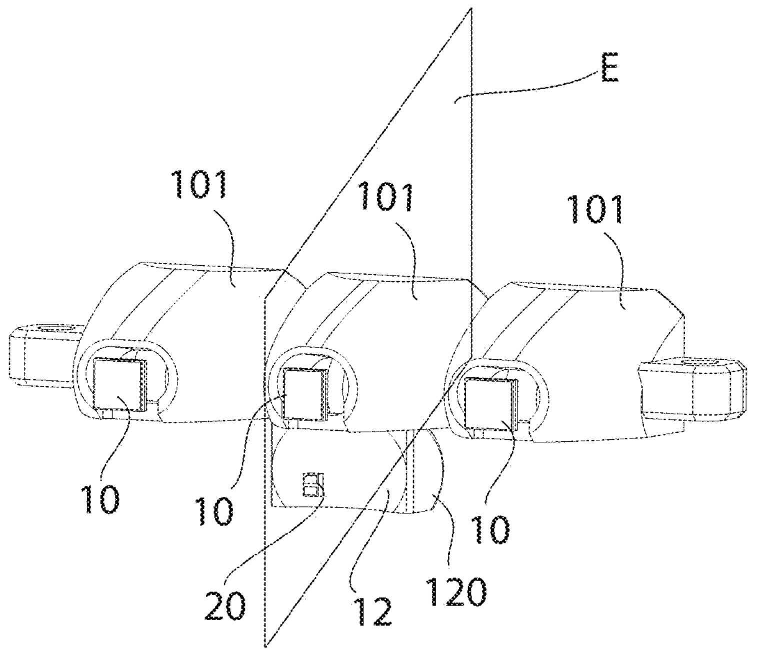
FIG. 3 shows a perspective view of part of the illumination device from diagonally behind.

As can be seen in FIG. 3, there are three light sources 10 provided in the example shown, wherein each of these light sources 10 injects light into a light injection element 101, and the light injection elements 101 inject this light into the light-permeable body 100.

By way of example, the projection device 500 and the light-permeable body 100 are made of the same material and in one piece.

The light-permeable body 100 has a screen device 103 with a screen edge region 104, wherein the screen device 103 is arranged between the at least one light injection element 101 and the projection device 500 in a light propagation direction.

The optical body 110 as well as the body forming the optical body 100 and the projection device 500 are respectively preferably a solid body, i.e. a body that has no through openings or voids. The transparent, light-permeable material which the bodies are made of has a refractive index greater than that of air. The material contains, for example, PMMA (polymethyl methacrylate) or PC (polycarbonate) and is in particular preferably made thereof. However, the bodies can also be made of glass material, in particular inorganic glass material. In the example shown, there are two separate bodies; however, the two bodies can also be formed in one piece.

The light S10 emitted by a light source 10 enters the light injection element 101 and is injected via this into the light-permeable body 100 and propagates in the light-permeable body 100 as a first light beam S1. In a manner known to a person skilled in the art, the first light beam S1 is modified by the screen device 103 into a modified second light beam S2, which is displayed by the projection device 500 by means of the emerging light beam LL as the light distribution LV to be produced (or as part of the light distribution LV to be produced; in the case of several light sources 10, these form the light distribution LV together). The light distribution LV in the form of dipped beam distribution is shown by way of example in FIGS. 5 and 6.

The light distribution LV produced with the at least one light source 10, which is, for example, front area light or dipped beam distribution, has a cut-off line HD, wherein the cut-off line HD, in particular the shape and position of the cut-off line HD, is determined by the screen edge region or a screen edge 104 of the screen device 103.

In the example shown, the screen device 103 is formed by a first boundary surface 106 and a second boundary surface 105 of the light-permeable body 100. The two boundary surfaces 105, 106 converge in the common screen edge 104 or the screen edge region 104.

The second boundary surface 105 is arranged upstream of the second boundary surface 106 in the direction of light propagation. In the example shown, the second boundary surface is horizontal and approximately parallel to the direction of light propagation, whilst the first boundary surface is transverse to the direction of light propagation.

In addition, the illumination device 1 has at least one further light source, in the present case exactly one further light source, the so-called sign light light source 20. In addition, a further sign light light injection element 120 associated with the sign light light source 20 is provided, wherein the sign light light injection element 120 forms the light S20 emitted by the sign light light source 20 into a third light beam S3 and directs the third light beam S3 onto the first boundary surface 106 such that light rays, in particular substantially all light rays of the third light beam S3, enter the light-permeable body 100 via the first boundary surface 106.

The sign light light injection element 120 is preferably located, as shown, on a lower side of the at least one light injection element 101.

At least some, preferably all, of the light rays S4 which have re-entered the light-permeable body 100 are projected by the projection optics device 500 as a sign light light beam SL into a region B of the light distribution LV lying above the cut-off line HD (see FIG. 5) and are displayed, for example as sign light light distribution SV.

The at least one light source 10 and the sign light light source 20 are preferably arranged in such a way that the main light beam directions X1, X2 of the at least one light source 10 and the sign light light source 20 run parallel to one another. In the present example, the “direction of light propagation” approximately corresponds to the direction of the main light beam directions.

By way of example, it is provided that the at least one light source 10 and the sign light light source 20 respectively comprise(s) one or more light-emitting elements, for example one or more LEDs.

In general, regardless of the specific design of the respective light source/sign light light source, it should be noted at this point that the phrasing "at least one light source (for producing the light distribution)" means that exactly one such light source, but of course also two or more such light sources can be provided in order to produce the light distribution. The phrasing "has a sign light light source)" does not exclude the possibility that two or more such sign light light sources can be provided for producing sign light.

As shown in FIG. 1, the light rays S2 from the light source 10 for producing the light distribution LV reach an upper region of the projection device 500 or a region above a horizontal plane in which an axis of symmetry or the optical axis of the projection device 500 lies. As a result, these light rays S2 are "inverted" downwards by the corresponding curvature or design of the projection device 500 as emerging light rays LL and form light distribution LV lying in the traffic area or on an aiming screen in a lower region, in particular below the 0°-0° line, which is delimited at the top by the cut-off line.

The screen edge region or the screen edge 104 lies substantially within a focal line or focal surface of the projection device 500; accordingly, the screen edge is displayed as a cut-off line in the light image LV, which is produced with the light rays of the light beam S1.

In contrast, the light beams S4 from the sign light light source 20 reach a lower region of the projection device 500 and are emitted upwards as a light beam SL due to the corresponding curvature of the projection device 500 and accordingly form the sign light light distribution SV which lies above the 0°-0° line.

The sign light light injection element 120 and the at least one light injection element 101 are preferably formed integrally, particularly from the same material, and form a transparent body 110.

The optical body 100 and the light injection elements are designed in such a way that, on the one hand, light propagates in them in a straight line and, on the other hand, a large part of it is totally reflected when it strikes boundary walls and can exit the respective body/element at corresponding exit surfaces or the projection device 500.

Figure 6:
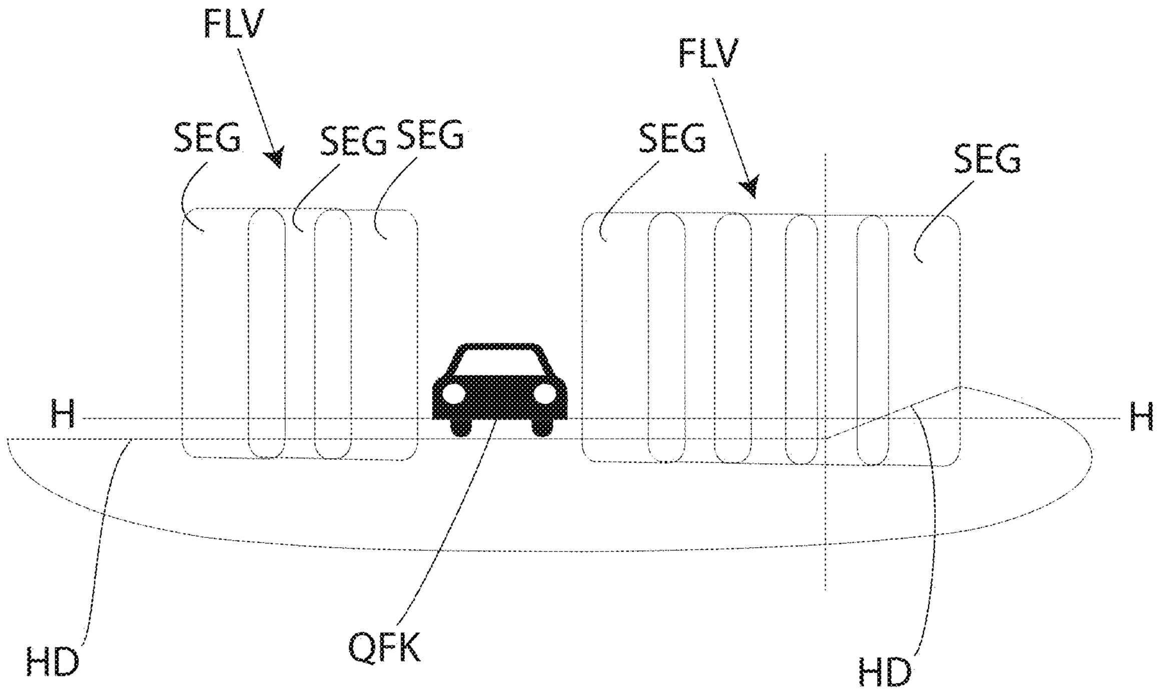
FIG. 6 shows dipped beam distribution together with partial full beam distribution without sign light light distribution.

According to FIG. 1, the illumination device 1 further comprises an additional light module 200, which is designed, as shown in FIG. 6, to produce segmented additional light distribution FLV, which comprises several light segments SEG, wherein the additional light distribution FLV and the light distribution LV together form full beam distribution if all light segments SEG are activated. In the vertical direction, the additional light distribution FLV adjoins the light distribution LV, i.e. the front area light or dipped beam distribution, or there is a certain overlap of the two light distributions.

The additional light light module 200 is preferably designed, as described, to form segmented additional light distribution, which consists of laterally adjacent or overlapping light segments SEG, which can be activated and deactivated individually. As a result, a region in which a vehicle, for example of oncoming traffic QFK, is located, can remain unilluminated by switching off the corresponding light segment such that the oncoming traffic QFK is not dazzled.

Specifically, the full beam light module 200 (see FIG. 1) comprises a light source 201, for example a multi-chip LED, with which the segmented additional light distribution FLV can be produced in a known way in cooperation with optical elements 202-205 (imaging lenses 202, 204, 205, aperture diaphragm 203).

In dipped beam mode the at least one light source 10 (in this case the three light sources 10) for producing the light distribution LV and the sign light light source 20 for producing the sign light light distribution SV are activated and the additional light module is deactivated. In full beam mode the at least one light source 10 (or in this case the three light sources 10) for producing the light distribution LV and the additional light light module 200 are activated, wherein this is activated in such a way that all light segments SEG are illuminated, and the sign light light source 20 can also be activated.

In partial full beam mode or ADB mode in which one or more light segments SEG are deactivated in the additional light distribution FLV to dim out certain regions such as oncoming traffic QFK, the sign light light source 20 is also deactivated (or at least dimmed).

Thanks to the design according to the invention, the sign light light source can be switched off (or dimmed) in partial full beam mode, for example, such that the sign light cannot emit any unwanted scattered light in this operating state. In an operating state in which the light distribution, in particular front area light distribution or dipped beam distribution, is produced with the at least one light source, the sign light light source can be switched on such that a sign light light distribution is produced in addition to the light distribution, independently thereof.

However, in the prior art, the sign light light distribution is produced together with the front area light or dipped beam (i.e. the at least one light source responsible for producing the front area light or dipped beam distribution is also responsible for producing the sign light light distribution) and cannot be switched off independently thereof.

The invention accordingly has advantages in terms of the glare value, in particular when the illumination device is operated in ADB (Advanced Driving Beam) mode, in which individual regions or segments of partial full beam distribution can be switched off. The fact that the sign light is switched off in this operating state, in contrast to the prior art, means that it cannot cause glare in the hidden region or in the hidden/switched off segments. Safety can be enhanced for all road users thanks to the reduction of undesired "residual light", in particular in hidden regions, made possible by the invention. In dipped beam mode, the sign light can be activated to enable the driver, for example, to read overhead signs more easily.

Figure 2:
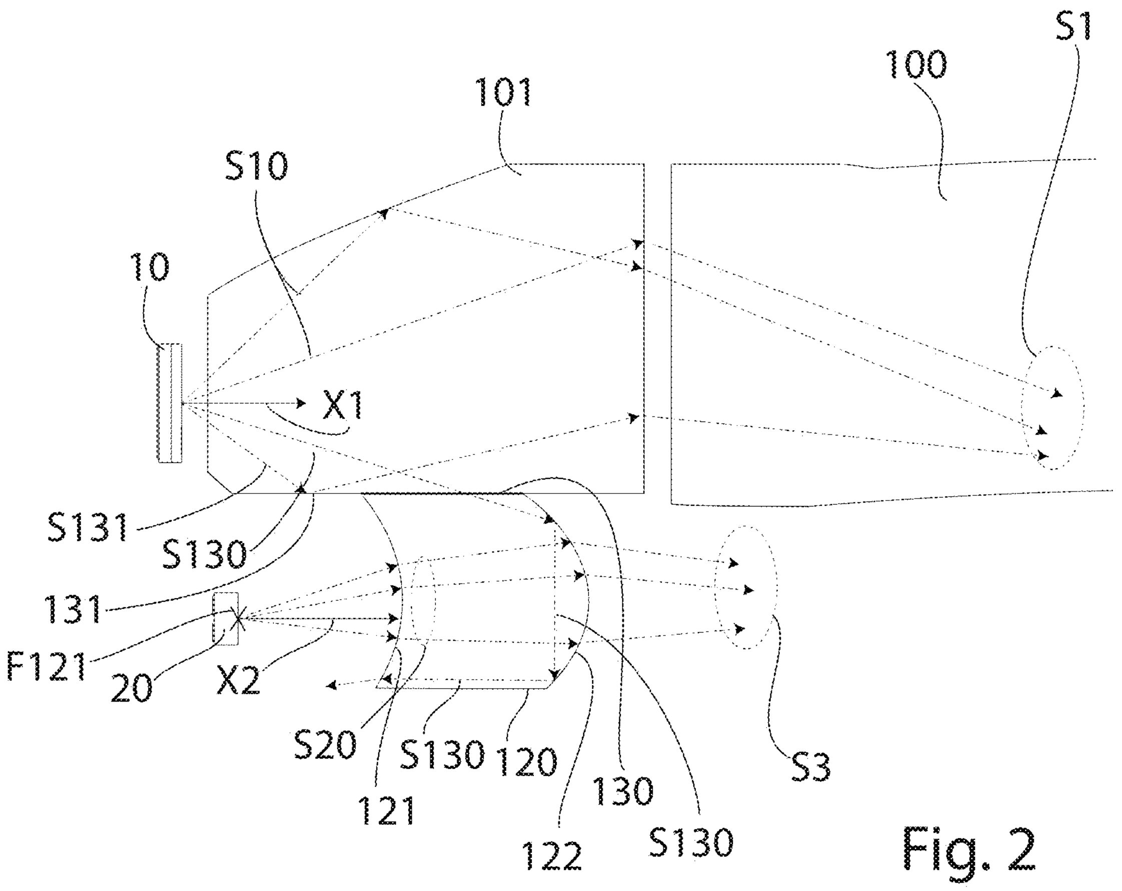
FIG. 2 shows a detail view of the illumination device in the region of the sign light light source.

As shown in FIG. 1, but in particular in FIG. 2, it is preferably provided that the sign light light injection element 120 comes into contact with the light injection element 101 in a common contact region or in a common contact area 130. This has the advantage in particular when the two elements 101, 130 are made of the same material that the incident light rays are not deflected in their direction of propagation and can therefore be better controlled in terms of design.

The contact region or contact area 130 is advantageously positioned in such a way, for example in relation to or at a distance from the at least one light source 10 that at least some of the light rays S130 coming from the light source 10 which enter the sign light light injection element 120 via the contact region or contact area 130 are totally reflected at a light exit surface 122 of the sign light light injection element 120.

This light S130 accordingly does not contribute to the light distribution and is deflected into a region where it remains unused and is, for example absorbed. In particular, as shown, the light S130 is deflected backwards and exits the sign light light injection element 120 unused.

In addition, it can be provided that the contact region or contact area 130 is positioned in such a way, for example in relation to or at a distance from the at least one light source 10 that at least some of the light rays S131 coming from the light source 10 which strike a light injection element boundary surface 131 of the light injection element 101 upstream of the contact region or contact area 130 are totally reflected at the light injection element boundary surface 131 into the light injection element 101 in the direction of the light-permeable body 100. The light injection element boundary surface 131 is the boundary surface on which the contact area 130 lies. This light S131 can thus contribute to the light distribution, for example to the front area light or dipped beam distribution.

The sign light light source 20 is preferably positioned as close as possible to a light entry surface 121 of the sign light light injection element 120 in order to be able to capture as much light as possible and in order to minimize rays emitted by the sign light light source 20 that could enter the light injection element 101 as stray light.

As shown, it can be provided that the light entry surface 121 of the sign light light injection element 120 is concave and the light exit surface 122 is convex. In particular, it can be provided that the sign light light injection element 120 has a focal point F121, wherein the sign light light source 20 is arranged substantially in this focal point F121.

The light entry surface 121 is preferably as concave as possible in order to increase the injection efficiency, by the light source being arranged in the concave cavity resulting from this design, preferably as deep as possible, and thus being enclosed by the light entry surface 121 at least in the angular range in which the light source emits light.

Due to the preferably convex light exit surface 122, the scattered light S130 is largely totally reflected and deflected away backwards, as has already been described above.

The in particular highly curved design of the light entry surface 121 makes it possible to achieve the most highly curved light exit surface 122 possible such that light rays S130 coming from the light injection element 101 that enter the sign light light injection element 120 are deflected by total reflection at the light exit surface 122 such that they cannot emerge from the sign light light injection element 120 in the direction of light propagation. This scattered light is preferably deflected backwards, against the actual direction of light propagation.

It is preferably provided that, as shown in FIG. 1, the light emitted by the sign light light source 20 is emitted by the sign light light injection element 120 directly onto the boundary surface 106.

In this context, "directly" should be understood to mean that the light is not influenced further on its way to the surface 106 and in particular does not undergo any deflection either, i.e. propagates in a straight line to the boundary surface 106.

The light injection element 101 is preferably designed in such a way that it forms the light, which is emitted by the light source 10 and enters the light injection element 101, into the first light beam S1, wherein the light beam S1 is preferably directed into the screen edge region or into a region of the screen edge 104 of the screen device 103.

In this way, bright light distribution LV is produced in the region of the cut-off line, with brightness decreasing towards the bottom.

Figure 4:
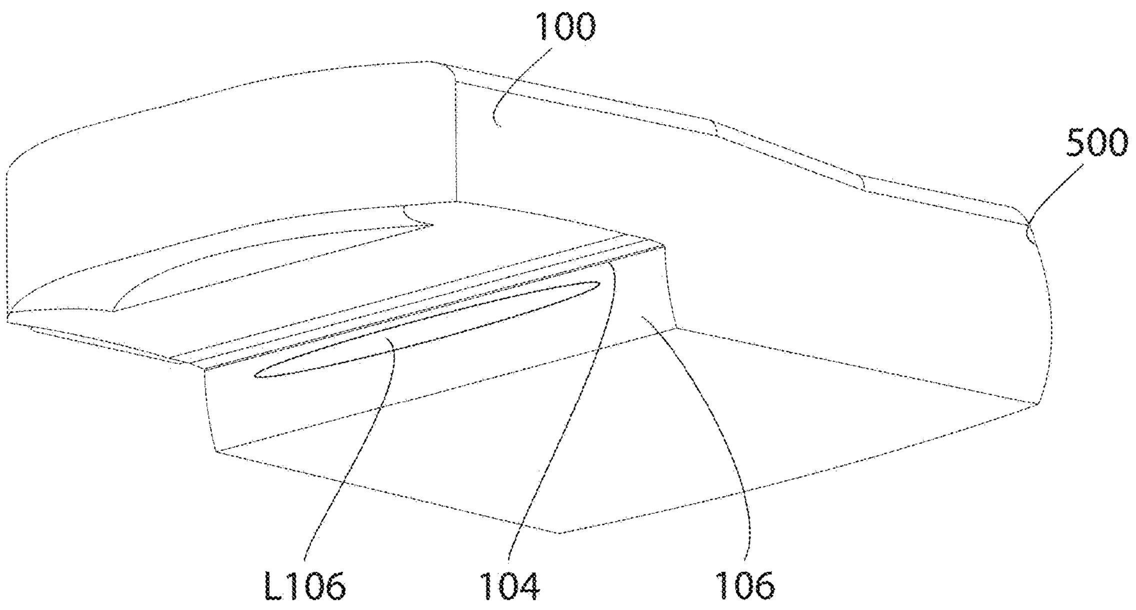
FIG. 4 shows a perspective view of the optical body with a screen edge device in a view from diagonally behind.

It can be provided that, as shown in FIG. 4, the sign light light injection element 120 illuminates the boundary surface 106 with the third light beam S3 in such a way that a maximum of the illuminance of the light pattern L106 formed on the boundary surface 106 is at a distance greater than zero from the screen edge 104 and/or the light pattern L106 is at a distance greater than zero from the screen edge 104.

Figure 5:
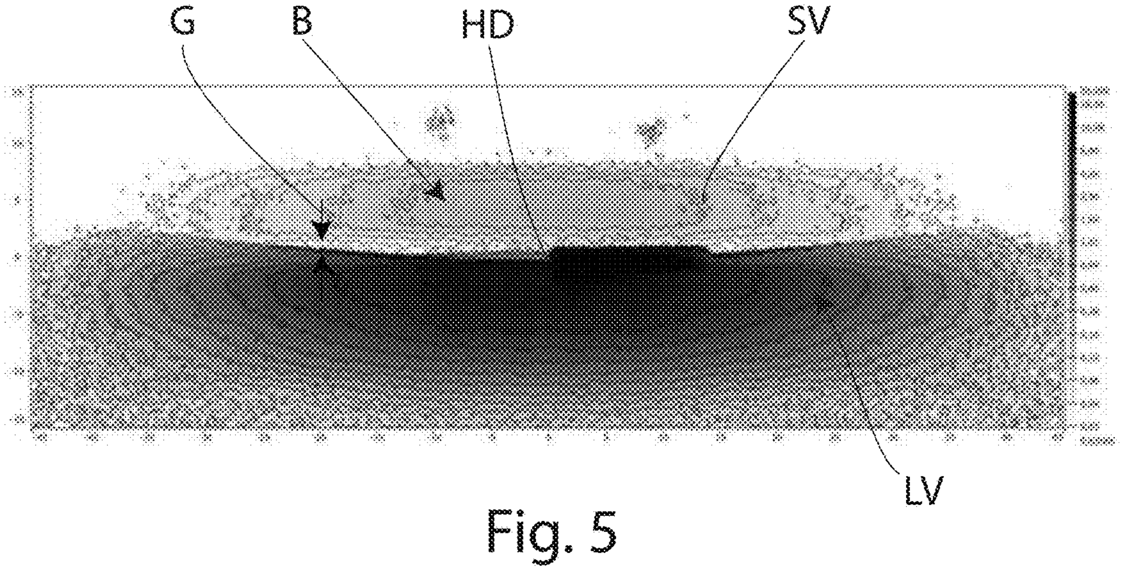
FIG. 5 shows an exemplary, schematic illustration of light distribution in the form of dipped beam distribution and sign light light distribution.

This allows a gap G to be created in the overall light distribution in the traffic area or on a vertical aiming screen in front of the illumination device between the dipped beam distribution and the sign light light distribution, as shown in FIG. 5.

The phrasing "light pattern at a distance" refers to the edge of the light pattern that surrounds the light pattern, wherein any region of the edge that lies on the boundary surface 106 is at a distance greater than zero from the screen edge 104.

It is further advantageous when the sign light light injection element 120 is designed in such a way that the light beam S3 emerging from the sign light light injection element 120 is widened in the horizontal direction.

For example, the sign light light injection element 120 is anamorphic or astigmatic or the light entry surface 121 and/or the light exit surface 122 are designed in such a way that the light pattern L106 formed on the boundary surface 106 is widened/distorted in the horizontal direction and can thus produce wide illumination. Such a design can be achieved by virtue of the fact that there is less curvature of the sign light light injection element 120 in the horizontal direction compared to the vertical direction.

Furthermore, the sign light light injection element 120 can be designed in such a way that the light rays of the light beam S3 emerging from the sign light light injection element 120 converge in the vertical direction.

In particular, this can be used to efficiently direct light into the desired region, i.e. in particular onto the surface 106 under the edge 104.

This can be achieved, for example, by the light exit surface 122 being convex in the vertical direction (i.e. in vertical sections parallel to the main light beam direction X1, X2).

In horizontal sections, the light exit surface 122 can also be curved, preferably convex, in particular with a different curvature/radius of curvature than in the vertical direction.

It can further be provided that the boundary surface 106 is convex in the vertical direction (i.e. in vertical sections), as shown in FIG. 4, such that light rays S4. The light rays S4 enter the optical body 100 via the boundary surface 106 and reach the projection device 500, from which they are projected into a region in front of the illumination device 1.

The boundary surface 106 preferably lies within or substantially within a focal surface or Petzval surface of the projection device 500 such that the region on the boundary surface 106 illuminated by the light rays S4 is projected by the projection device 500 into the traffic area.

To achieve light uniformity, it can be provided that the boundary surface 106 of the light-permeable body 101 has a light diffusing structure, e.g. a grain.

Finally, it can be provided that an outer surface of the projection device 500 is formed by a grooved structure in a smooth base surface, wherein the grooves forming the grooved structure run in a substantially vertical direction, and wherein two grooves lying horizontally next to one another are preferably respectively separated by an elevation running in particular substantially vertically and preferably extending over the entire vertical extent of the grooves.

The invention claimed is:

1. An illumination device (1) for a motor vehicle headlight for producing a light distribution (LV), the illumination device comprising:

at least one light source (10);
a light-permeable body (100);
at least one light injection element (101) for injecting light emitted by the at least one light source (10) into the light-permeable body (100); and
a projection device (500),
wherein the light-permeable body (100) has a screen device (103) with a screen edge region (104) and the screen device (103) is arranged between the light injection element (101) and the projection device (500) in a light propagation direction,
wherein light (S10) from the at least one light source (10) enters the light-permeable body (100) via the light injection element (101), which light propagates in the light-permeable body (100) as a first light beam (S1), and wherein the screen device (103) modifies the first light beam (S1) into a modified second light beam (S2), which is displayed by the projection device (500) as the light distribution (LV) to be produced,
wherein the light distribution (LV) has a cut-off line (HD), wherein the shape and position of the cut-off line (HD) is determined by a screen edge region or a screen edge (104) of the screen device (103),
wherein the screen device (103) is formed by at least one boundary surface (106) of the light-permeable body (100), and
wherein the illumination device (1) has at least one further light source, the so-called sign light light source (20), as well as a further sign light light injection element (120) associated with the sign light light source (20), wherein the sign light light injection element (120) forms the light (S20) emitted by the sign light light source (20) into a third light beam (S3) and directs the third light beam (S3) onto the boundary surface (106), such that substantially all light rays of the third light beam (S3) enter the light-permeable body (100), and
wherein at least some of the light rays (S4) which have re-entered the light-permeable body (100) are projected by the projection optics device (500) as a sign light light beam (SL) into a region (B) of the light distribution (LV) lying above the cut-off line (HD).

2. The illumination device according to claim 1, wherein the sign light light injection element (120) comes into contact with the light injection element (101) in a common contact region or in a common contact area (130).

3. The illumination device according to claim 2, wherein the contact region or contact area (130) is positioned in relation to or at a distance from the at least one light source (10) such that at least some of the light rays (S130) coming from the light source (10) which enter the sign light light injection element (120) via the contact region or contact area (130) are totally reflected at a light exit surface (122) of the sign light light injection element (120).

4. The illumination device according to claim 2, wherein the contact region or contact area (130) is positioned in relation to or at a distance from the at least one light source (10) such that at least some of the light rays (S131) coming from the light source (10) which strike a light injection element boundary surface (131) of the light injection element (101) upstream of the contact region or contact area (130) are totally reflected at the light injection element boundary surface (131) into the light injection element (101) in the direction of the light-permeable body (100).

5. The illumination device according to claim 1, wherein a light entry surface (121) of the sign light light injection element (120) is concave, and/or a light exit surface (122) of the sign light light injection element (120) is convex.

6. The illumination device according to claim 5, wherein the sign light light injection element (120) has a focal point (F121), and the sign light light source (20) is arranged substantially in the focal point (F121).

7. The illumination device according to claim 1, wherein the sign light light injection element (120) and the light injection element (101) are integrally formed from the same material, optionally by the sign light light injection element (120) and the light injection element (101) being injection moulded together in an injection moulding process.

8. The illumination device according to claim 1, wherein the at least one light source (10) and the sign light light source (20) are arranged in such a way that the main light beam directions (X1, X2) of the at least one light source (10) and the sign light light source (20) run parallel to one another.

9. The illumination device according to claim 1, wherein the at least one light source (10) and the sign light light source (20) are arranged in a common plane and/or the at least one light source (10) and the sign light light source (20) are arranged on a common printed circuit board.

10. The illumination device according to claim 1, wherein the light emitted by the sign light light source (20) is emitted by the sign light light injection element (120) directly onto the boundary surface (106).

11. The illumination device according to claim 1, wherein the light injection element (101) forms the light, which is emitted by the light source (10) and enters the light injection element (101), into the first light beam (S1), wherein the light beam (S1) is directed into the screen edge region or into a region of the screen edge (104) of the screen device (103).

12. The illumination device according to claim 1, wherein the sign light light injection element (120) illuminates the boundary surface (106), which forms the screen device (103) or is at least part of the screen device (103), with the third light beam (S3) in such a way that a maximum of the illuminance of the light pattern (L106) formed on the boundary surface (106) is at a distance greater than zero from the screen edge (104) and/or the light pattern (L106) is at a distance greater than zero from the screen edge (104).

13. The illumination device according to claim 1, wherein the sign light light injection element (120) is designed in such a way that the light beam (S3) emerging from the sign light light injection element (120) is widened in the horizontal direction.

14. The illumination device according to claim 1, wherein the sign light light injection element (120) is designed in such a way that the light rays of the light beam (S3) emerging from the sign light light injection element (120) converge in the vertical direction.

15. The illumination device according to claim 1, wherein the boundary surface (106) is convex in the vertical direction.

16. The illumination device according to claim 15, wherein the boundary surface (106) lies within or substantially within the Petzval surface or a focal surface of the projection device (500).

17. The illumination device according to claim 1, wherein the boundary surface (106) of the light-permeable body (101) has a light diffusing structure.

18. The illumination device according to claim 17, wherein the light diffusing structure is a grain.

19. The illumination device according to claim 1, wherein the illumination device (1) further comprises an additional light module, which is designed to produce additional full beam distribution, wherein the additional light module is designed to produce segmented additional light distribution (FLV), which comprises two or more light segments (SEG), and wherein the additional light distribution and the light distribution (LV) together form full beam distribution if all light segments (SEG) of the additional light distribution (FLV) are illuminated, and wherein in dipped beam mode the at least one light source (10) for producing the light distribution (LV) and the sign light light source (20) for producing a sign light light distribution (SV) are activated and the additional light module is deactivated, and wherein in partial full beam mode at least one light source (10) for producing the light distribution (LV) and the additional light module are activated, wherein the additional light module is operated in such a way that one or more light segments (SEG) are not illuminated and the sign light light source (20) for producing the sign light light distribution (SV) is dimmed or deactivated.

20. A motor vehicle headlight having at least one illumination device according to claim 1.

21. The illumination device according to claim 1, wherein all of the light rays (S4) which have re-entered the light-permeable body (100) are projected by the projection optics device (500).

22. The illumination device according to claim 1, wherein the light rays (S4) projected by the projection optics device (500) as the sign light light beam (SL) into the region (B) of the light distribution (LV) lying above the cut-off line (HD) are displayed as a sign light light distribution (SV).

* * * * *